3,287,498
LOADING COIL SET EMBEDDED IN A CAST BODY
Werner Paul Raub, Tumba, Sweden, assignor to Telefonaktiebolaget L M Ericsson, Stockholm, Sweden, a corporation of Sweden
Filed Jan. 14, 1963, Ser. No. 251,355
Claims priority, application Sweden, Jan. 17, 1962, 473/62
4 Claims. (Cl. 178—46)

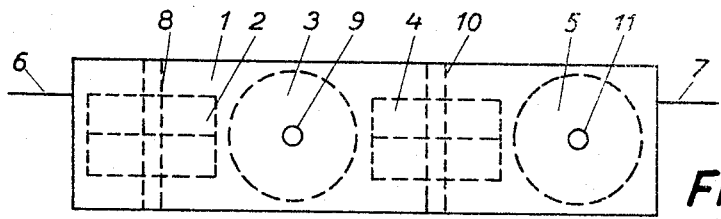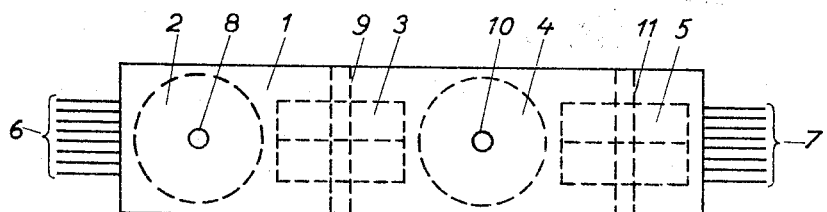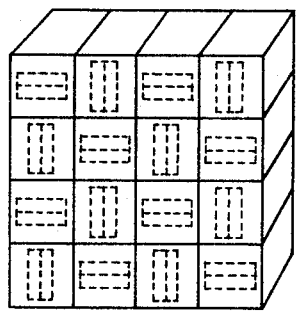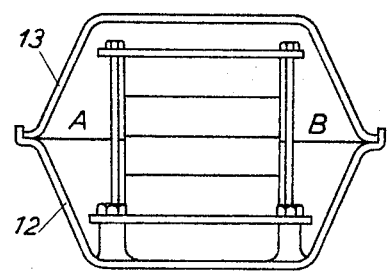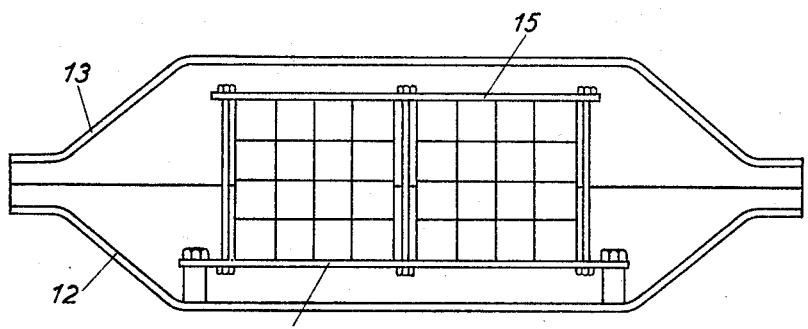

The present invention refers to a loading coil set embedded in a cast body that is suitable as a construction element for the building a loading coil block with a selected number of coils mountable in a cable box for connection between cables entering into the box.

When loading telephone cables, it has heretofore been the practice to protect the loading coils against moisture by embedding the coils in an insulating compound. To this end the coils are usually placed in a separate box, or in a separate space limited by intermediate walls in a joint box used for splicing of cables that are to be loaded. The box used for the coils—or the space used in the joint box—is after having placed the coils therein, filled with an insulating moisture protecting compound. This embedding of the loading coils has the disadvantage that it is difficult to obtain access to the individual coils for replacement. If a fault occurs in an individual coil, all the insulating compound must be melted off in order to make the faulty coil accessible. Furthermore, special steps such as magnetic screening have to be taken when placing the coils in the box to avoid crosstalk.

The object of the invention is to eliminate these disadvantages. A number of loading coils with pot cores are embedded in a cast body of for instance thermosetting resin, which cast body is suitable as a construction element for the assembly of a loading coil block of any selected size mountable in a cable box for connection of coils between cables entering into the box. The invention is specially characterized by the cast body being designed as an oblong principally parallelepiped-formed module, along the longitudinal axis of which the loading coils are located. By this arrangement considerable advantages are obtained in comparison with the known devices. By embedding the loading coils in the mentioned way in modules, large loading coil blocks containing any desired number of coils may be assembled. In each module the coils are protected by the resin against electrical stresses as well as against moisture of the air. By a convenient orientation of the coils in the module as well as by an adequate dimensioning of the module, no troublesome steps are required to avoid crosstalk; the modules may be placed in a certain manner along each other to build up the block. When a fault occurs in a coil, the module in which the coil is located, may be easily replaced. The cables running into the box may be connected each one on one side of the block, which results in a simple pattern of wiring and easy splicing work.

The invention will be further described by means of an embodiment with reference to attached drawing, in which FIGS. 1 and 2 show in two projections perpendicular to each other a module containing four loading coils, FIG. 3 schematically shows how the modules are mounted in a loading coil block, FIG. 4 shows a longitudinal sectional view of a cable box with two coil blocks, and FIG. 5 shows the same cable box in cross sectional view.

In a body 1 of cast resin four loading coils with pot cores 2, 3, 4 and 5 are embedded. The cast body has the form of a square parallelepiped, the coils being located along the longitudinal axis thereof. In order to avoid that the coils, which are placed close to each other, cause crosstalk by their leakage fields, the coils 2 and 4 are so orientated that their center axes are perpendicular to two of the long sides of the parallelepiped, while the center axes of the two other coils are perpendicular to the other two long sides.

The cast body or module 1 is provided with holes 8, 9, 10, 11, which coincide with the center holes of the respective pot cores, whereby trim cores may be introduced into the pot cores after the casting.

The connection wires of the loading coils extend through the short sides of the module, the inlet wires being gathered in a wire group at one short side, and the outlet wires in a wire group at the other short side. In the figures these wire groups are indicated by numerals 6 and 7.

In FIG. 3 a coil block containing 16 modules is shown. As each module contains 4 loading coils, such a block contains a total of 64 coils. In the figure the outermost coil in each module is indicated by dotted lines. The modules are so orientated that adjacent coils always are turned 90° with reference to each other, whereby mutual crosstalk is reduced to a minimum.

In the FIGS. 4 and 5 a cable box is shown schematically, said cable box containing two coil blocks, each one containing 64 coils. The cable box is made in two halves, a lower half 12 and an upper half 13 which may be soldered together to form an airtight container. The modules are held together between a base plate 14, in a convenient manner fixed to the lower half of the box, and a cover plate 15 which by means of bolts and nuts is fastened to the base plate. To connect cables to the box, the cable entering at one end of the box is carried into the space A between the coil block and the one side wall of the box and connected in this space to the connection wires of the block on this side, while the cable entering into the box at the other end of the same is carried into the space B and there connected to the connection wires on this side of the block.

The shown embodiment is only given as an example on how to build the loading coil construction according to the invention. The arrangement can, of course, be varied in many ways. The number of coils in the module may vary, the loading coil block may be of any selected size and the cable box may be designed for any selected number of coil blocks placed in different ways.

I claim:
1. A loading assembly for electric cables, said assembly comprising a plurality of modules disposed in several superimposed layers, each of said modules including a row of loading coils embedded in a hardened thermosetting insulation material of substantially rectangular configuration, the lengthwise center axis of said row of coils being in substantial registry with the lengthwise center axis of said module and the center axis of individual coils in the row being perpendicular to the lengthwise center axis of the module, the center axes of each two adjacent coils in the same layer of modules and in each two superimposed layers of modules being disposed in mutually orthogonal relationship.

2. A loading assembly according to claim 1 wherein one coil of each two adjacent coils in said row of coils in each module has a center axis perpendicular to one pair of opposite long sides of the respective module and the other coil a center axis perpendicular to the other pair of opposite long sides of said respective module.

3. A loading assembly according to claim 1 wherein conductors connected to one terminal of each coil in each module are embedded in said mass from one short side thereof and conductors connected to the other terminal of each coil are embedded in said mass from the other short side thereof.

4. A loading assembly according to claim 1 wherein said modules are disposed to form a block having two opposite plane parallel sides constituting terminal panels for connecting the two cables to each other through the coils in the modules.

References Cited by the Examiner

UNITED STATES PATENTS

| | | | |
|---|---|---|---|
| 2,548,199 | 4/1951 | Crane et al. | 178—46 |
| 2,675,526 | 4/1954 | Friberg | 334—74 |
| 2,978,681 | 4/1961 | Sims et al. | 340—174 |

FOREIGN PATENTS

| | | |
|---|---|---|
| 327,646 | 12/1902 | France. |
| 357,209 | 9/1931 | Great Britain. |

HERMAN KARL SAALBACH, *Primary Examiner.*

M. NUSSBAUM, *Assistant Examiner.*